United States Patent
Neuhaus

(10) Patent No.: US 7,106,836 B2
(45) Date of Patent: Sep. 12, 2006

(54) SYSTEM FOR CONVERTING TEXT DATA INTO SPEECH OUTPUT

(75) Inventor: Ralf Neuhaus, Lünen (DE)

(73) Assignee: Siemens Aktiengesellschaft, Munich (DE)

( * ) Notice: Subject to any disclaimer, the term of this patent is extended or adjusted under 35 U.S.C. 154(b) by 55 days.

(21) Appl. No.: 10/497,195

(22) PCT Filed: Nov. 18, 2002

(86) PCT No.: PCT/DE02/04243

§ 371 (c)(1),
(2), (4) Date: May 27, 2004

(87) PCT Pub. No.: WO03/055158

PCT Pub. Date: Jul. 3, 2003

(65) Prior Publication Data

US 2005/0053202 A1    Mar. 10, 2005

(30) Foreign Application Priority Data

Dec. 11, 2001    (DE) .................. 101 60 673

(51) Int. Cl.
  *H04M 11/00*    (2006.01)

(52) U.S. Cl. .................. 379/88.14; 379/88.13; 379/88.17; 379/93.01

(58) Field of Classification Search ............ 379/88.13, 379/88.14, 88.16, 88.17, 93.01
See application file for complete search history.

(56) References Cited

U.S. PATENT DOCUMENTS

| 5,640,590 A * | 6/1997 | Luther ................ 715/500.1 |
| 6,263,051 B1 | 7/2001 | Saylor et al. |
| 2002/0087323 A1* | 7/2002 | Thomas et al. ............ 704/270 |
| 2003/0223556 A1* | 12/2003 | Ju et al. ................ 379/93.24 |

FOREIGN PATENT DOCUMENTS

| DE | 100 17 503 A1 | 10/2001 |
| EP | 0 650 284 A1 | 4/1995 |
| EP | 1 113 631 A2 | 7/2001 |
| WO | WO 01/57851 A1 | 8/2001 |

* cited by examiner

*Primary Examiner*—Ovidio Escalante

(57) ABSTRACT

The invention relates to a system, in which applications are interconnected by means of a network. Text data can be output as speech data by at least one application. A service that is provided for converting the text data into speech output by at least two applications.

9 Claims, 1 Drawing Sheet

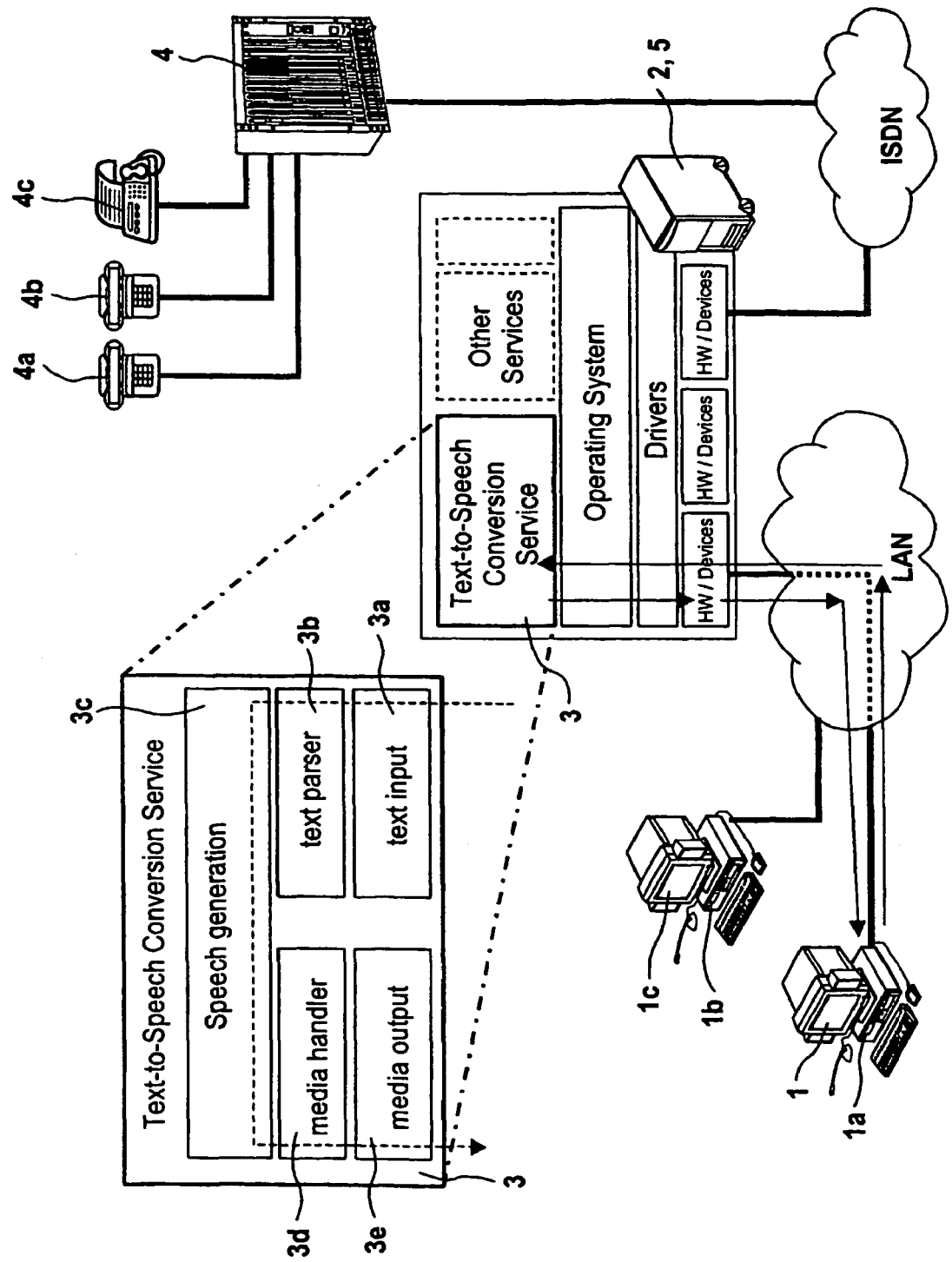

SYSTEM FOR CONVERTING TEXT DATA INTO SPEECH OUTPUT

CROSS REFERENCE TO RELATED APPLICATIONS

This application is the US National Stage of International Application No. PCT/DE02/04243, filed Nov. 18, 2002 and claims the benefit thereof. The International Application claims the benefits of German Patent application No. 10160673.7 DE filed Dec. 11, 2001, both of the applications are incorporated by reference herein in their entirety.

FIELD OF INVENTION

The invention relates to a system having applications in line with the precharacterizing part of claim 1 which are connected to one another by means of a network, with text data being able to be output in the form of speech data by at least one application.

BACKGROUND OF INVENTION

It is known practice to convert information which is available in the form of texts or numerical values into an audio signal for output in the form of speech. This is necessary, by way of example, if there is no possible way of outputting data visually, that is to say a screen or display is not available, but rather only a loudspeaker or a simple telephone. Speech output of numerical values is used by directory inquiries, for example, in order to notify the customer of the desired telephone number. To this end, the information which is to be output is first of all divided into information units which are as small as possible. Using a table or an algorithm, each in formation unit is converted into a syllable or into a sequence of syllables. The compiled succession of syllables is converted into an audio signal by an output unit. In the directory inquiries example, the speech signal produced is transmitted to the caller via the telephone network.

Another known example of the conversion of text into speech is the "e-mail to speech" function with which services for distributing electronic mail, "e-mail systems", are often equipped. In this case, an e-mail may be "read" from any telephone line by virtue of the user calling a specific line for the e-mail server. Following authentication, a service provided in the e-mail system converts the text of the e-mail into speech and "reads" the content of the e-mail aloud to the user. If the conversion involves analyzing the syntax—which is also referred to as "parsing"—then the service for creating the succession of syllables is also called a "parser". Unlike the service which is used for directory inquiries, the parser used in the e-mail system is more complex, because not just single digits are converted, but rather the full vocabulary of a natural language, and usually an intonation is produced in addition. In this case, the parsers often draw a distinction between different natural languages, that is to say have a different "pronunciation" for German, English, French etc. and may furthermore often even use either male or female speech patterns (speech samples) for output or else speech patterns recorded by the user himself beforehand. For the purpose of speech output, frequently also referred to as speech "synthesis", use is normally made of units which are equipped with specially programmed DSPs (DSP=Digital Signal Processor) or other components produced specifically for this purpose.

U.S. Pat. No. 6,263,051 B1 "System And Method For Speech Service Bureau" discloses a central service in a communication network for handling telephone calls automatically. In this case, the central service receives all of the relevant data for a telephone call which is to be held via a data interface, for example an XML interface. This central service then uses a communication installation to set up a voice connection to a telephone subscriber, and uses a speech output device ("T-T-S=Text-to-Speech Engine") to handle interactive communication with the telephone subscriber. Depending on the telephone number dialed, the central service is connected either to landline telephones or mobile telephones (and hence natural communicating parties) or else voice mail systems, telephone answering machines or similar machines which can be connected to a telephone line. In this case, the known method involves speech output always being effected in the form of an audio signal via a telephone line. The central service may be supplied with the data required for the next call via various paths, and therefore via different data interfaces. In this context, the known arrangement represents a "virtual call center", so to speak, which calls a customer for a particular use, for example for telephone banking, provides him with information by means of speech output and stores his keystrokes on the telephone.

The printed document WO 01/57851—Freeland et al., "Speech System", shows an arrangement for outputting a text message in the form of speech. The arrangement shown in this case allows speech output using a voice which is an approximation of the voice of a selected natural person. In this context, the voice profiles of known personalities are preferably provided for selection. For the purpose of speech output, a communication network is then used to transmit a text message to a centrally arranged service which converts the text message into synthetic speech and then outputs the speech on another, previously specified terminal in the communication network.

In the usual systems for speech output of text-based information, it has been found to be a drawback that each unit or each service needs to reserve its own respective devices, that is to say software and hardware, as special applications for speech output of text-based information for the purpose of synthesizing and outputting the speech data.

SUMMARY OF INVENTION

The invention is thus based on the object of improving the systems for speech output of text-based information such that they can be used universally.

This object is achieved by the features specified in claim 1. The features of the subclaims advantageously develop the system.

This object is achieved by virtue of the speech output also being effected, under the control of the application (1, 1c), as transmission in the form of speech data back to the application.

The text data can be converted into speech data at any location in a network, with at least one application being a communication installation and the speech data being able to be output on a voice terminal or forwarded as a data packet.

Further applications using the service to convert text data into speech data can be added to a network particularly easily if information about the functions of the service can be retrieved from a management server.

Retrieving information about the functions of the service is particularly simple and safe if the information can be retrieved using a protocol.

The complexity for administering a network comprising applications and services is minimized if the information comprises the address of the service and/or details about the manner in which it is used.

Alignment of the applications for accessing the service becomes simpler if program parts for using the service are available on the management server.

When a service is started afresh in a network, it can be used by the applications without making any adjustments to the applications or restarting the applications by virtue of the service setting up connections to the applications and sending these applications information about its functions.

If the service is used in order to report faults in a network to a network administrator, the network's operability may be quickly restored even in the absence of the network administrator.

BRIEF DESCRIPTION OF THE DRAWING

An exemplary embodiment of the system is described below with reference to the drawing, where the single figure shows two networks with a server on which a service for converting text into speech data is installed.

The FIGURE, FIG. 1, shows a PC 1a on which an application (application program) 1 is installed.

DETAILED DESCRIPTION OF INVENTION

By way of example, the application 1 is intended to output an e-mail using speech output. To this end, it uses a network LAN to set up a connection to a service server 2 on which a text-to-speech service 3 is installed. Using a specific protocol, the application 1 transmits the text which is to be output and also a set of control commands to the text-to-speech service 3.

The control commands comprise details of whether and when the output is to be made, what procedure is to be adopted in the event of output being unsuccessful, and what voice is to be used for the output. The output destinations which may be selected are, by way of example, return in the form of a speech data packet or output in the form of a speech signal in the B channel in an existing connection or in a connection which is to be set up afresh.

In the present example, the output is to be made using the loudspeaker connected to the PC 1a, which means that return in the form of a speech data packet is selected in the control command. The output time selected is the "immediately" setting, that is to say directly after conversion. For later output, the protocol has provision for transmission at any times.

The instruction regarding what procedure is to be adopted in the event of output being unsuccessful is particularly important for output using the B channel of a telephone connection which is to be set up afresh. It may be that the subscriber to be called up does not take the "call" or that the line is engaged. For such cases, the protocol affords the option of inputting the number of repetitions of the output and the interval of time between them.

The commands for selecting the voice allow a selection to be made between "male", "female" or "based on own speech samples". In addition, it is possible to select from various national languages, such as German, English, French etc. In the present example, the application 1, that is to say the e-mail program installed on the PC 1a, uses information about the author of the e-mail (which information is held in the e-mail system's address directory) in order to set the sex and national language of the speech output, for example male and German.

Once the text-to-speech service 3 has the text data and all information required for the conversion, it uses the text parser 3b to convert the text received via the text interface 3a into a succession of syllables and uses previously stored speech samples to form a speech data record containing audio information in the speech generator 3c. This speech data record is converted by a media handler 3d into the format predefined by the control commands and is transmitted to the PC 1a via a connection in the network LAN using the output function media output 3e. In the PC 1a, the speech data are buffer-stored by the application 1 and are then output using the loudspeakers on the PC 1a.

To be able to use the text-to-speech service 3 in the manner described above, the application 1 has information about the address of the service 3 and about the capabilities of this service 3, that is to say the control commands which can be used in the protocol. To this end, the text-to-speech service 3, upon being started, stores its service features at a location in the network which has been set up for the purpose, a "look up service". This is known, by way of example, from JINI (Java Intelligent Network Infrastructure) and UPnP (Microsoft Universal Plug and Play); in the example in this case, a proprietary solution is used. The information provided in the look up service comprises the information about the fact that a text-to-speech service 3 is available for automatically converting transmitted texts into speech output, details about how many resources are available, details about the languages supported, information about what address in the network LAN, ISDN and what path are used for the text-to-speech service 3, details about additional functions, and finally information about how to use the text-to-speech service 3. In the example, the texts to be converted are transmitted in XML (extended mark up language) format, since in this case the chosen character set (and hence the national language) and the structure information are already being transferred as well. It goes without saying that other text formats may also be transferred.

As an alternative to the described registration with a "look up service", the text-to-speech service 3 may, after it has been started or at predetermined intervals of time, also actively search the network LAN for applications which are able to use such a service 3, and may actively register with these applications 1.

The FIGURE also shows terminals 4a, 4b, 4c connected to a communication installation 4. The communication installation 4 is a circuit switched ISDN exchange system, but may also be a communication application in a VoIP communication arrangement (voice over data network communication arrangement; VoIP=Voice over IP; IP=Internet Protocol).

On the basis of the application 1, the terminal 4a is now used to send a text-based short message (SMS—Short Message Service) to the terminal 4b. The communication installation 4 (which in this case is considered, in the generalized sense, to be a further application which differs from the application 1 technically) forwards text-based short messages only to such terminals 4a, 4c as are known to be terminals "with text capability" in the subscriber table in the communication installation 4. Since the terminal 4b does not have an alphanumeric display for outputting text messages, speech output is required. The communication installation 4 sets up a connection to a look up service, installed on a management server 5, in the same way as the applications 1, 1c and requests the addresses and capabilities of the available text-to-speech service 3 for converting text data into speech data. In the present example, the service server 2 is simultaneously used as a management server 5. The text-to-speech service 3 has, as desired, the capability to output a short message (SMS) as speech. On the basis of the information obtained from the look up service, the communication installation 4 now generates a query which comprises the text to be converted and satisfies that protocol which is used by the text-to-speech service 3 to receive orders. The query with the text message is then transmitted to the service server 2, where it is received by the buffer store 3a for the service 3, is forwarded to the parser 3b, is converted by the latter into a succession of syllables which corresponds to the syntax of the text, and is converted into a speech data sequence by the speech generator 3c. The media handler 3d prepares the speech data for output in the format which is used for output via the B channel of a telephone connection. The output module 3e now sets up a telephone connection to the communication installation 4 and in so doing dials up the subscriber 4b directly. When the call has been taken on the terminal 4b, the speech data are then played back.

Instead of the communication installation 4, it is also possible for an appropriately equipped terminal 4a, 4c to forward a text message for speech output directly to the service 3 without the need for the communication installation 4 to have the capabilities of communication with the management server 5 and the service server 2.

The invention claimed is:

1. A system for outputting text data in the form of speech, comprising:
   a text to speech conversion service for converting text data into speech output;
   a transmission in the form of an audio signal via a telephone connection of the speech output;
   a management server to store information about an address and about a usable control commands in the text to speech conversion service; and
   a plurality of computer applications connected to one another by a computer network, wherein the plurality of computer applications retrieve the information from the management server, and to create control commands using the retrieved information and to transmit the text data and the control commands to the service, and to receive the speech output from the text to speech conversion service.

2. The system as claimed in claim 1, wherein the speech output is used by at least two of the computer applications.

3. The system as claimed in claim 1, wherein at least one application is a communication installation and the speech data is output on a voice terminal or is forwarded as a data packet.

4. The system as claimed in claim 3, wherein the information is retrieved using a protocol.

5. The system as claimed in claim 1, wherein the information comprises details about the manner in which the text to speech conversion service is used.

6. The system as claimed in claim 1, further comprising a plurality of program components available on the management server for using the text to speech conversion service.

7. The system as claimed in claim 1, wherein the text to speech conversion service establishes a plurality of connections to the computer applications and transmits to the computer applications information about the text to speech conversion service's functions.

8. The system as claimed in claim 1, wherein the text to speech conversion service is used to report faults in the computer network to a network administrator.

9. The system as claimed in claim 1, wherein at least two of the computer applications are different computer applications.

* * * * *